United States Patent [19]

Yoshimura et al.

[11] Patent Number: 5,444,537
[45] Date of Patent: Aug. 22, 1995

[54] METHOD FOR SHAPE DETECTION AND APPARATUS THEREFOR

[75] Inventors: Kazunari Yoshimura; Kuninori Nakamura, both of Kadoma, Japan

[73] Assignee: Matsushita Electric Works, Ltd., Osaka, Japan

[21] Appl. No.: 138,191

[22] Filed: Oct. 20, 1993

[30] Foreign Application Priority Data

Oct. 27, 1992 [JP] Japan .................................. 4-289153

[51] Int. Cl.$^6$ ............................................. G01B 11/24
[52] U.S. Cl. .................... 356/376; 250/559.22
[58] Field of Search ................ 356/375, 376; 250/558, 250/561

[56] References Cited

U.S. PATENT DOCUMENTS 4,088,048  5/1978  Burcher et al. ..................... 356/376
4,443,706  4/1984  Di Matteo et al. ................. 356/376

FOREIGN PATENT DOCUMENTS 2-186213  7/1990  Japan .

Primary Examiner—F. L. Evans
Attorney, Agent, or Firm—Burns, Doane, Swecker & Mathis

[57] ABSTRACT

A shape detecting arrangement allows a shape of an object to be very precisely detected at a high resolution, by projecting a plurality of light beams in mutually different ways onto an identical spot of the object substantially in an identical direction, forming on a position detector images of beams of the projected beams reflected back from the object, obtaining a ratio of intensity of the reflected beams by virtue of outputs from the position detector, obtaining positions of the respective reflected beams by virtue of variation component of the ratio of intensity with respect to a reference plane for detecting the position of the object, and finally obtaining height displacement of the respective positions obtained with respect to the reference plane on the basis of the positions and angles of incidence of the reflected beams into the position detector.

19 Claims, 21 Drawing Sheets

METHOD FOR SHAPE DETECTION AND APPARATUS THEREFOR

BACKGROUND OF THE INVENTION

This invention relates to a method for shape detection and an apparatus therefor, which are capable of detecting uneven shape and height displacement of an object.

DESCRIPTION OF RELATED ART

For the shape detecting arrangement of the kind referred to, there has been disclosed in Japanese Patent Laid-Open Publication No. 2-186213 an apparatus in which a device for projecting light beams onto an object the shape of which is to be detected and a device for receiving the beams reflected from the object are disposed as mutually separated by a fixed distance. A position detector is provided in the beam receiving device for detecting, as a positional variation of received light spot, a variation in incident angle of the reflected beam corresponding to a distance of the reflected beam receiving device with respect to the object, so that the shape of the object can be detected by means of triangulation on the basis of outputs from the position detector.

In the above apparatus, the beam projecting device comprises a laser beam source, a beam expander for expanding a diameter of the projected beam from the source, a pair of light path adjusting mirrors, a vibration mirror forming a polariscope for scanning the beam, and converging lens for projecting the beams. The beam receiving device, on the other hand, comprises a light receiving converging lens, and another vibration mirror forming also a polariscope driven in synchronism with the above vibration mirror for forming an image of received light spot on the position detector irrespective of the beam scanning.

According to this shape detecting apparatus, the arrangement is so set that, in the absence of the height displacement in respect of the reference plane, the image of the received light spot will be formed at a predetermined position in the position detector, a height displacement of a spot of the object to be detected is obtained on the basis of any displacement of an image forming position of the received light spot which position varying in accordance with the height displacement in reflected position of the projected beam when the object is present, and an outside shape of the object is detected by scanning its outside with the projected beam.

In the foregoing shape detecting apparatus according to Japanese Patent Laid-Open Publication No. 2-186213, a single beam is employed for the projection so that any moving amount of the reflected beam on the position detector represents the height displacement. The precision of detection, however, is influenced by a diameter of the projected beam, and it becomes difficult to attain a high resolution. Consequently, there has been suggested a measure for attaining the high resolution by means of an interpolation carried out with respect to the shape of the reflected beam, but it is still difficult to reach an intended level of the light resolution since, in this case, an image forming beam involves a variation in the quantity of light at very fine portion of the beam depending on a surface reflection factor of the object to be detected.

Investigating further the related prior art, there has been an arrangement as shown in FIG. 19 of the present application, in which a light beam projector PM and an image pickup device (CCD camera) RM with respect to the object for the shape detection are disposed on the same plane (XZ plane), so that an optical axis of the image pickup device RM is made to coincide with the ordinate Z, while the beam projector PM is disposed to direct its optical axis towards the crossing point O of the ordinate Z and abscissa X. Here, a distance between the point O and the image pickup device RM is set L1, a distance between the optical axis of the image pickup device RM and projecting point of the beam of the beam projector PM is set L2, and a distance between the abscissa X and the beam projecting point of the projector PM is set L3.

In this case, the light beams are projected in a lattice pattern with a sinusoidal brightness distribution and in diagonal direction from the projector PM to the point O, and then the beams are subjected to a phase modification in accordance with the height displacement (displacements in the direction of the ordinate Z) of the surface of the object, as shown in FIGS. 20($a$) and 20($b$), while a resultant phase displacement will be as shown by $d\phi$ in FIG. 20($c$). Here, an image of the object is picked up by the image pickup device RM, a phase modification component at optional point of the image is measured, and the height of this optional point is obtained.

With this arrangement, however, the surface of the object normally involving an irregularity in the reflection factor causes the projected beam thereon to be also subjected to an amplitude modification relying on the reflection factor in addition to the phase modification. In the present arrangement for the shape detection, slit-shaped light beams mutually deviated by ¼ pitch are projected onto the object, images of reflected beams of the respective slit beams projected are picked up by the image pickup device RM, and only the phase modification component is obtained irrespective of any amplitude modification by catching fluctuation in time of the brightness distribution.

The height displacement quantity Z at the optional point x on the abscissa may be obtained, from the relationship $$L2 = (L1-Z) \tan \beta + (L3-Z) \tan \alpha$$

$$\tan \beta = x/(L1-Z)$$

by a formula $$z = L3 - L2/\tan \alpha + x/\tan \alpha$$

Further, the optional point x is obtained fundamentally from the phase $\phi$ of the sinusoidal slit-shaped beam.

In FIG. 21, there is shown another known arrangement for the shape detection, in which, while substantially identical to the arrangement of FIG. 19, the shape of the object is detected by projecting the light beams the brightness of which sequentially decreases (or increases) in the direction of the abscissa X, in contrast to the arrangement in FIG. 19. Since the position of the beam projector PM and image pickup device RM is stationary, the brightness of the projected beams at respective points in an picked-up image of a reference plane, that is, a plane involving no height displacement can be determied preliminarily. Accordingly, the height displacement of the object, that is, the shape of the object can be detected in view of displacements of any point of a specific brightness.

In these known shape detecting arrangements described with reference to FIGS. 19 and 21, however, the light beams are projected concurrently in a planar manner, so that there will occur a mutual influence of secondary reflection beams between adjacent segments of the spot on which the beams are projected. Thusly a problem is caused to arise in that accurate quantity of the reflected beams cannot be measured, measurement precision is deteriorated, and any highly precise shape detection can not be attained.

SUMMARY OF THE INVENTION

An object of the present invention is, therefore, to provide a method for the shape detection and an apparatus for performing the method, which are capable of detecting very precisely the shape of the object to be detected without being influenced, in particular, by a secondary reflection while a high resolution is attained.

According to the present invention, this object can be realized by means of an arrangement for detecting a stereo-shape of an object to be detected by projecting a light beam on the object and receiving reflected beam from the object in a direction different from that of the projected beam, wherein a plurality of the light beams of mutually different patterns are projected to an identical spot on the object substantially in the same direction, an image of reflected beams of the respective beams projected to and reflected from the spot on the object is formed on a position detecting means, a ratio of intensity of the reflected beams is obtained on the basis of outputs from the position detecting means, positions of the respective reflected beams within the projected spot on the object are obtained on the basis of variation component of the ratio of intensity with respect to a reference plane, and height displacements of the obtained positions of the reflected beams with respect to the reference plane are obtained on the basis of the obtained positions and angles of incidence of the reflected beams into the position detecting means.

Other objects and advantages of the present invention shall become clear from following description of the invention detailed with reference to embodiments shown in accompanying drawings.

It should be appreciated here that, while the present invention shall now be described only with reference to the embodiments shown in the accompanying drawings, the intention is not to limit the invention to such embodiments shown but rather to include all alterations, modifications and equivalent arrangements possible within the scope of appended claims.

DETAILED DESCRIPTION OF THE PREFERRED EMBODIMENTS

Figure 1:
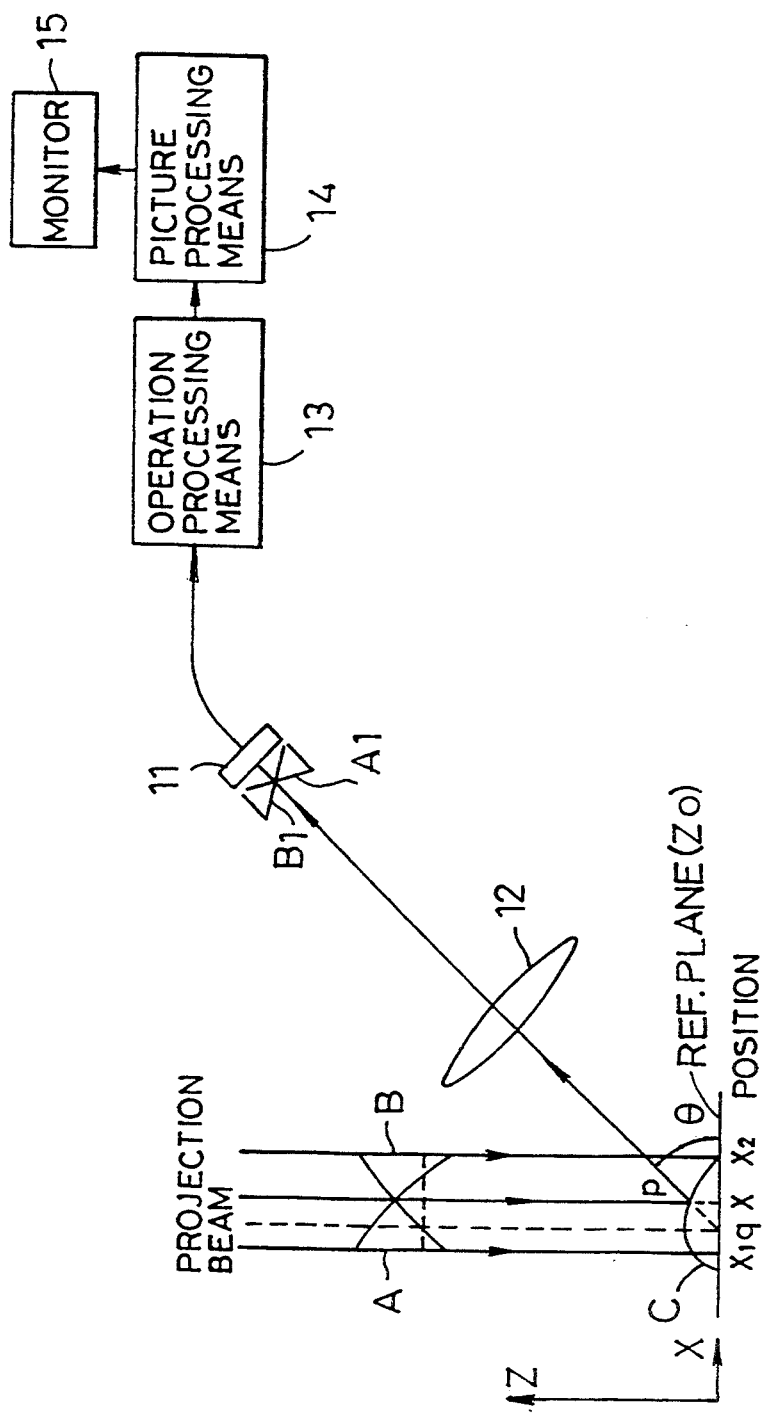
FIG. 1 is a schematic explanatory view for the shape detection apparatus in an embodiment according to the present invention.
Figure 2A:
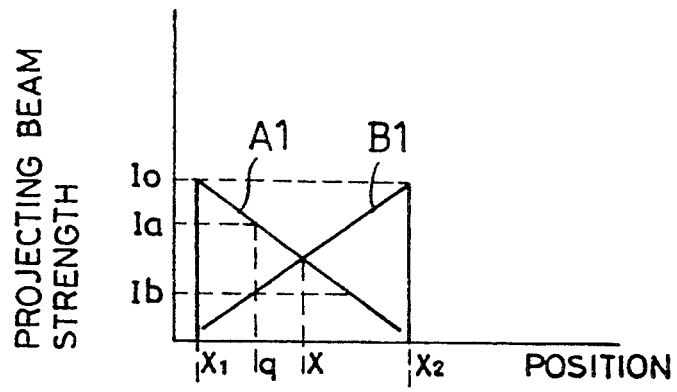
FIGS. 2(a), (b) and (c) are diagrams for explaining the operation of the apparatus in FIG. 1.
Figure 2B:
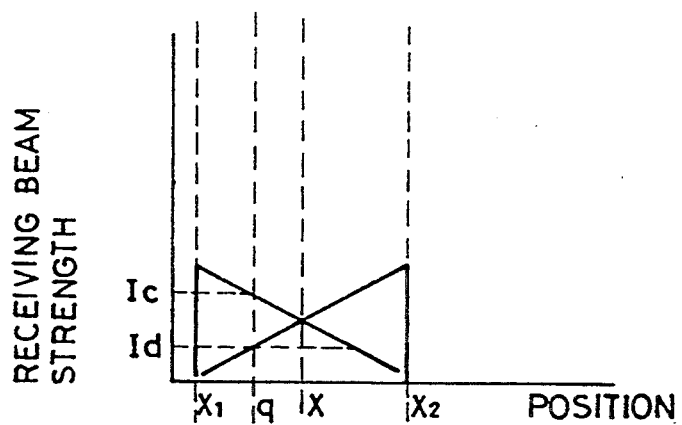
Figure 2C:
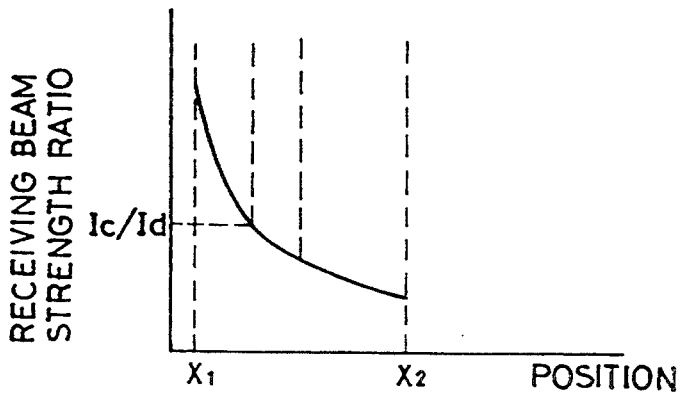
Figure 3:
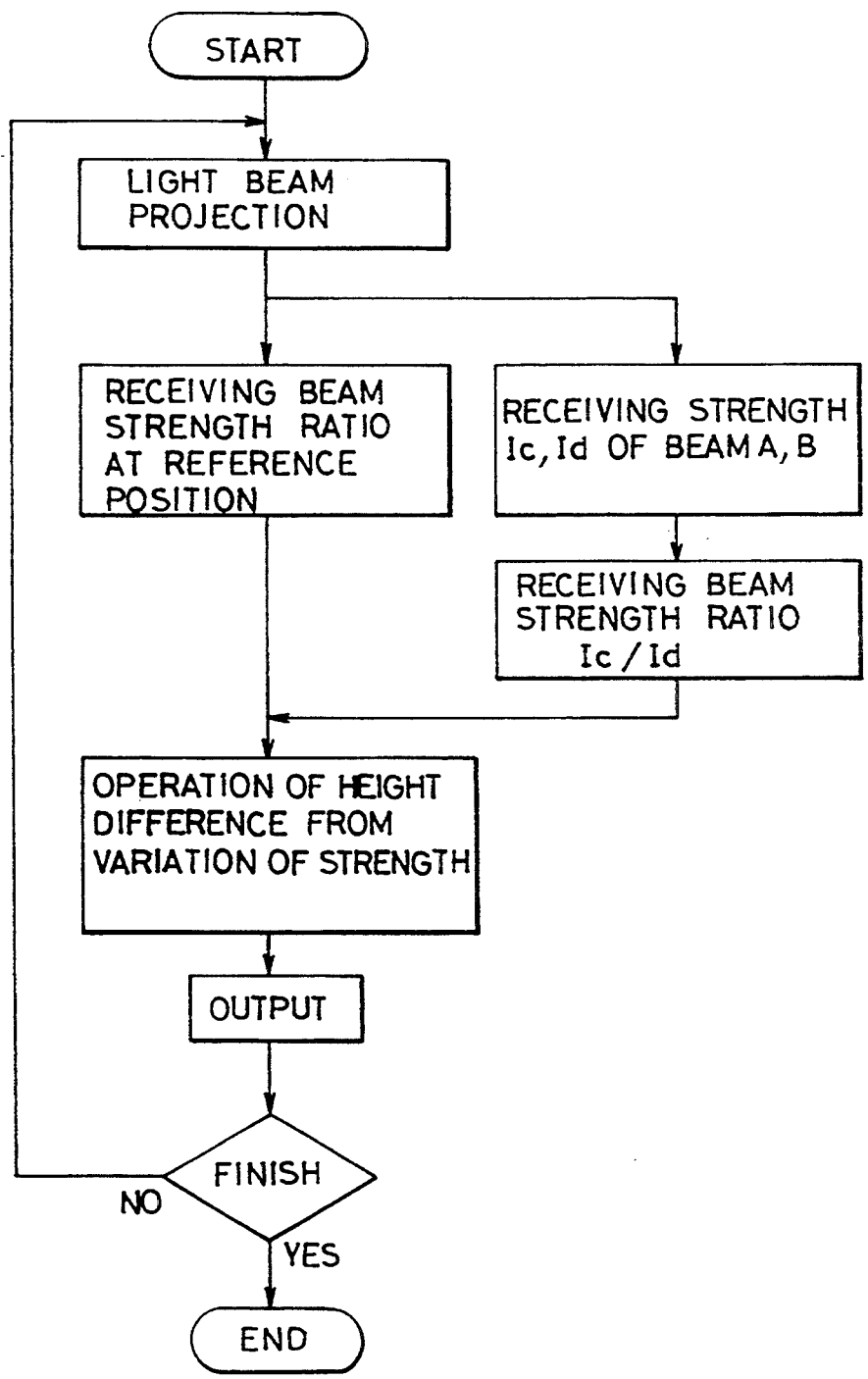
FIG. 3 is a flow chart showing the operation of the apparatus of FIG. 1.

Referring to FIGS. 1 to 3, the shape detection apparatus in an embodiment according to the present invention generally includes means (not shown) for projecting light beams onto an object C the shape of which is to be detected, and means for receiving reflected beams of the projected beams from the object C, both means being disposed as mutually separated by a predetermined distance. The beam projecting means projects onto a spot of the object C a plurality of the beams of light mutually different in the intensity as the different pattern and substantially in the same direction but with a relative time lag in a height direction (along the ordinate Z). In this case, the respective projected beams provide a projected beam spot of a diameter ranging $x_1$–$x_2$ in the drawings, and the plurality of the beams are projected as overlapped on one another to an identical spot of the range of $x_1$–$x_2$. Assuming here that two beams A and B are projected, for example, one projected beam A has such an intensity pattern as shown by a curve A1 in FIG. 2(a) in which the projected light intensity is high on one side of $x_1$ of the spot and decreases linearly towards the other side of $x_2$, whereas the other projected beam B has such an intensity pattern as shown by a curve B1 in FIG. 2(a) in which the intensity is high on the other side $x_2$ and decreases linearly towards the one side $x_1$.

Further, the beam receiving means includes a position detector 11 on which an image provided by the reflected beams from the object C is formed through a light receiving lens 12. In FIG. 1, only one of the reflected beams which is on the optical axis of the light receiving lens 12 is shown with a solid line, and this applies to all following drawings. For this position detector 11, it is preferable to employ one which comprises a light receiving element of a smaller diameter than that of formed-image spot of the received beams and set in array along a line in which the formed-image spot displaces in accordance with a height displacement with respect to a reference plane Z in the height direction for the positional detection of the object C, so that the respective reflected and received beams can be detected by the common light receiving element. Outputs of the position detector 11 are provided to an operation processing means 13 for obtaining the position in the projected spot of the projected beams, and a picture processing means 14 processes signals denoting the shape of the object C on the basis of operation result at the means 13 for displaying the shape on a monitor 15.

The detection of position in respect of the projected beam spot is carried out at the operation processing means 13 by means of a triangulation in view of a displacement in reflection angle of the reflected beams. At this operation processing means 13, next, a height position at an optional point in the interior of the projected beam spot $x_1$–$x_2$. Here, the optional point in the projected beam spot is obtained from the intensity of light of the projected beams. That is, the optional point in the projected beam spot is represented in the first meaning by the intensity of light of the projected beams when the height of the detection object C is sufficiently small with respect to light path length of the beams, and the interior point of the projected beam spot is obtained from the intensity of light of the projected beams.

Since in this case the optional point in the projected beam spot obtained in respect of only one of the projected beams involves an influence of secondary reflection and the like, the operation processing means 13 obtains the position of the optional point in the projected spot on the basis of an output ratio of the respective light receiving elements in the position detector resulting from the two projected beams. In FIG. 2(b), the projected light intensity obtained at the position detector 11 in an event where the projected beams are reflected on the reference plane is shown, and the ratio of intensity in that event is shown in FIG. 2(c). Provided here that a point at which an optical axis of the light receiving lens 12, for example, intersects the reference plane ZO is represented by "q" in FIGS. 1, 2(a) and 2(b), then a ratio of intensity of light (Ic/Id) of outputs Ic and Id of the position detector 11 in respect of the reflected beams at the point q of the reference plane is preliminarily obtained.

When the reflected beams involve a height displacement P from the reference plane, the light receiving element located at a position on the position detector 11 corresponding to the position of the optical axis of the light receiving lens 12 is caused to receive the beam of the intensity of light incident inherently at a point "x" on the reference plane but intersects the optical axis of the lens 12 at a point "p" on the surface of the object C, as shown in FIG. 1, and the position detector 11 obtains from this intensity of light the ratio of intensity (Ic/Id), determines that the beam is inherently of the point "x", and detects the height displacement of the reflected beam as $\overline{xP} = \overline{xq} \tan \theta$ on the basis the position displacement between the points "q" and "x" and the angle $\theta$ of the optical axis of the light receiving lens 12 with respect to the reference plane ZO.

While in the foregoing description of the apparatus with reference to FIG. 1 the disposition of the position detector 11 is made to be on the optical axis of the light receiving lens 12 for brevity's sake, points on the reference plane at which a line connecting between any one of other light receiving elements than that on the optical axis of the lens 12 and the central point of the lens 12 and extended towards the reference plane intersects the reference plane is preliminarily obtainable, and the height displacement at every point can be obtained with respect to every light receiving element in the same manner. For the sake of easy understanding, a flow chart of the foregoing operation is shown in FIG. 3.

Figure 4:
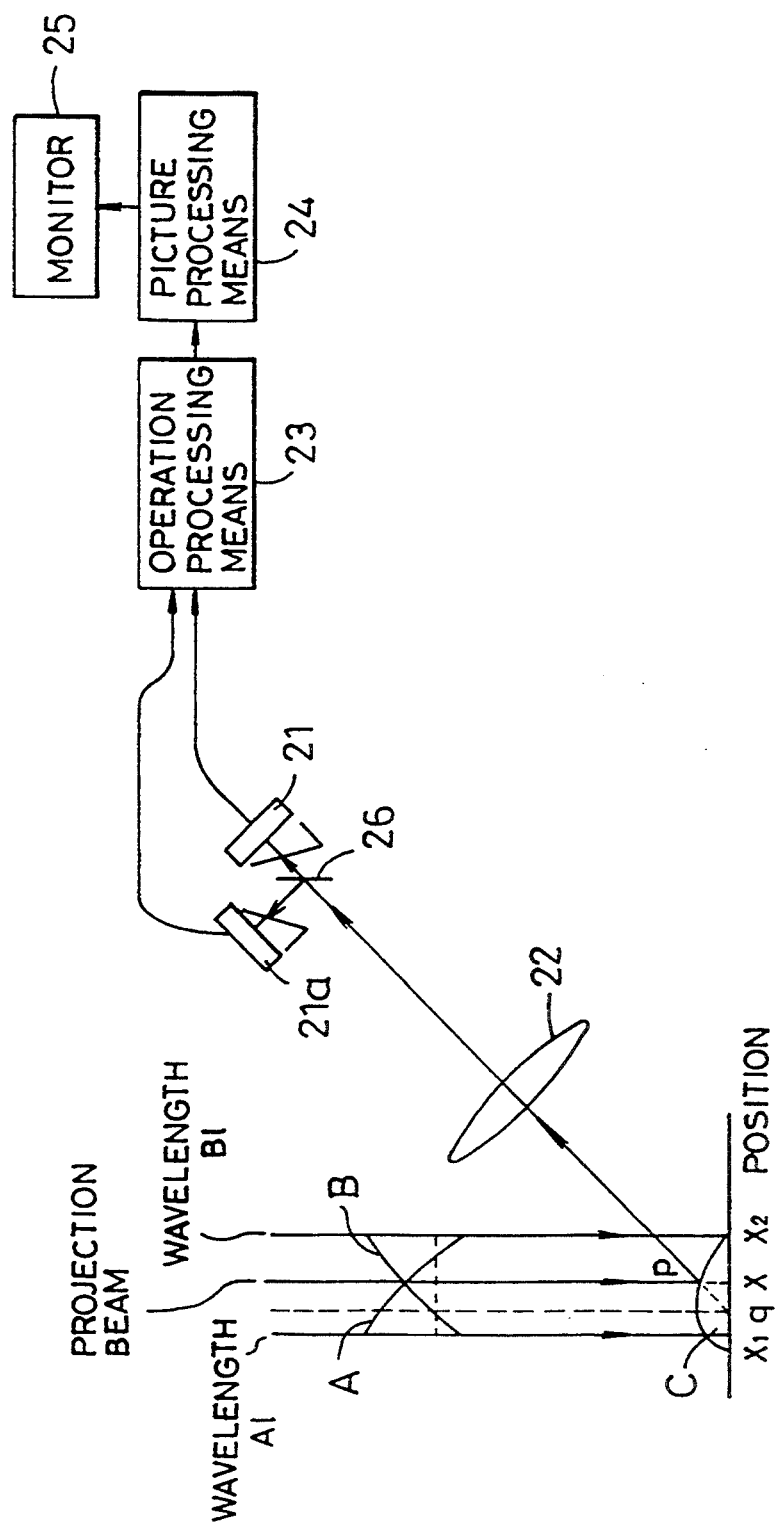
FIGS. 4, 4A and 5 are schematic explanatory views for the shape detection apparatus in other embodiments according to the present invention.
Figure 4A:
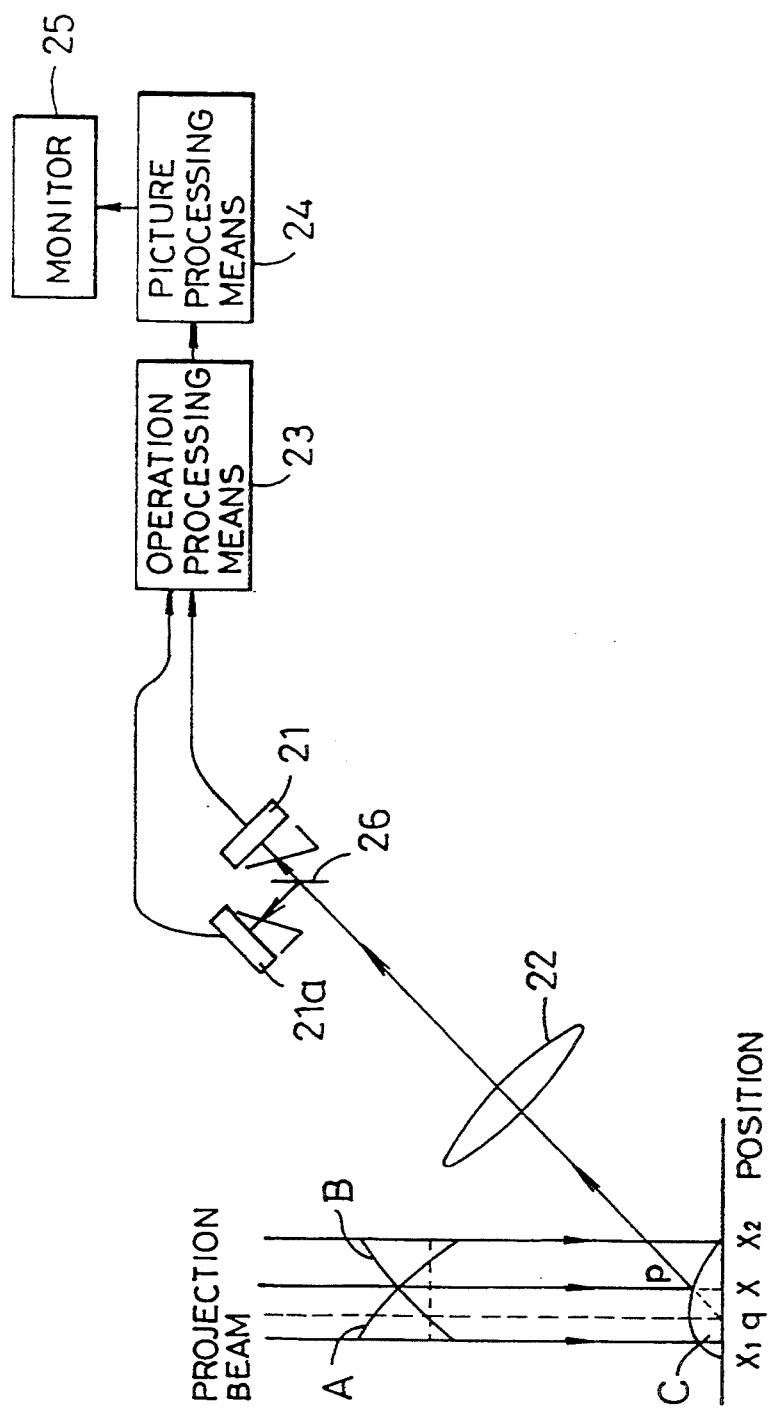

In another embodiment shown in FIG. 4 of the apparatus according to the present invention, in contrast to the foregoing embodiment of FIGS. 1 to 3 where the respective beams are projected individually one by one, the plurality of the beams are projected concurrently. In the present instance, the beam projecting means is made to project two beams of mutually different wavelength, the beam receiving means is provided with a pair of the position detectors 21 and 21a, the reflected beams concurrently received through the light receiving lens 22 are separated at a beam splitter 26 according to the wavelength, and images of the received beams are formed at the position detectors 21 and 21a. It is also possible to employ, as shown in FIG. 4A, an arrangement in which the two projected beams are made different in the polarization mode, instead of the wavelength, and are subjected to the image formation through the beam splitter 26 and at the respective position detectors 21 and 21a. With the arrangements of FIGS. 4 and 4A, required detection time up to the position detectors can be shortened effectively. In the present embodiment, further, other constituents and functions are substantially the same as those in the embodiment of FIGS. 1–3, and are denoted in FIG. 4 by the same reference numerals but with "10" added thereto.

Figure 5:
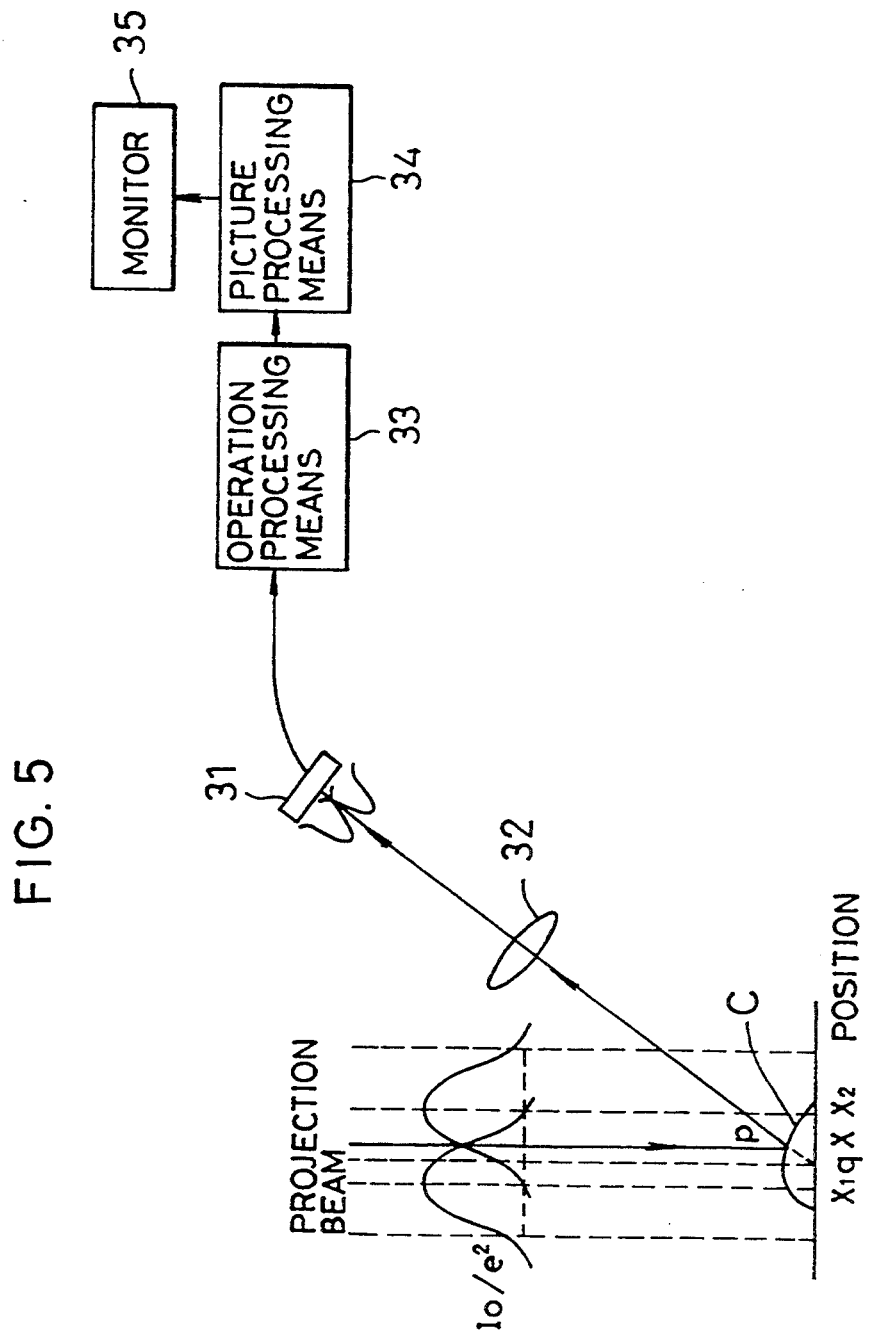
Figure 6A:
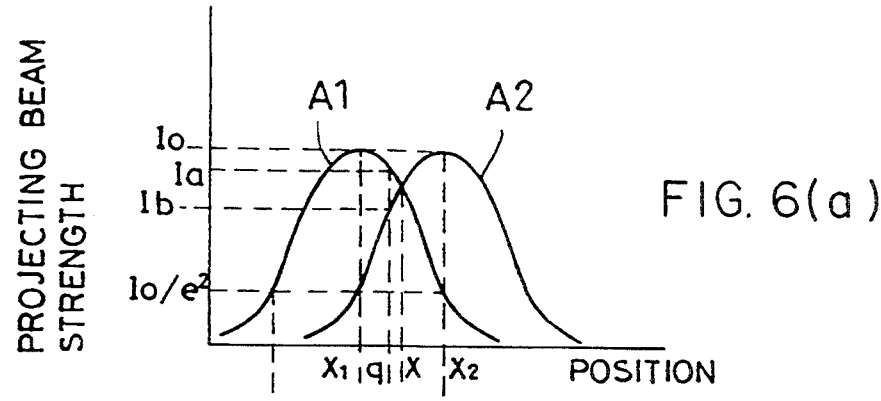
FIGS. 6(a) to (c) are explanatory views for the operation of the apparatus in FIG. 5.
Figure 6B:
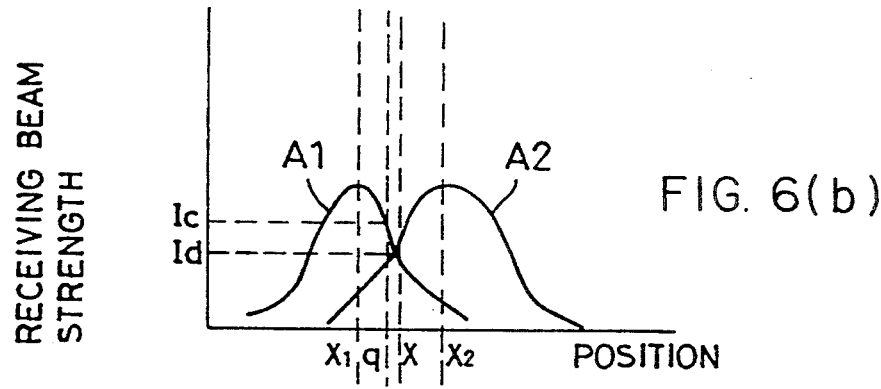
Figure 6C:
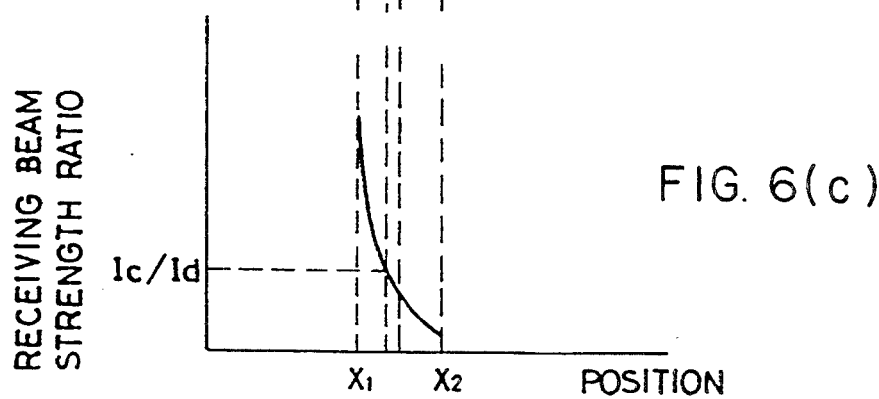

In another embodiment shown in FIG. 5, such beam having a Gauss distribution as a laser beam is employed for the projection, and two of such beams are projected onto the object C for the detection of shape, as mutually separated by a distance $\overline{x_1 x_2}$ corresponding to an intensity of light $Io/e^2$ when both beams projected are of an intensity Io, as shown in FIG. 6(a), while being overlapped on each other in an extent of $x_1-x_2$ for which the height displacement is obtained through the method described with reference to FIGS. 1 to 3. It is also possible to restrain any influence of the secondary reflection with this arrangement, and the shape of the object C can be detected highly precisely with a high resolution. In this case, too, the arrangement can be so made that the two beams are projected concurrently but with their wavelength or polarization mode made mutually different. In FIG. 6(b), there is shown intensity of light received at the light receiving elements in the position detector 31, and FIG. 6(c) shows the ratio of intensity of the light received. In the present instance, other constituents and functions are the same as those in the embodiment of FIGS. 1 to 3, and the constituents are denoted by the same reference numerals as used in FIGS. 1 to 3 but with "20" added thereto.

Figure 7:
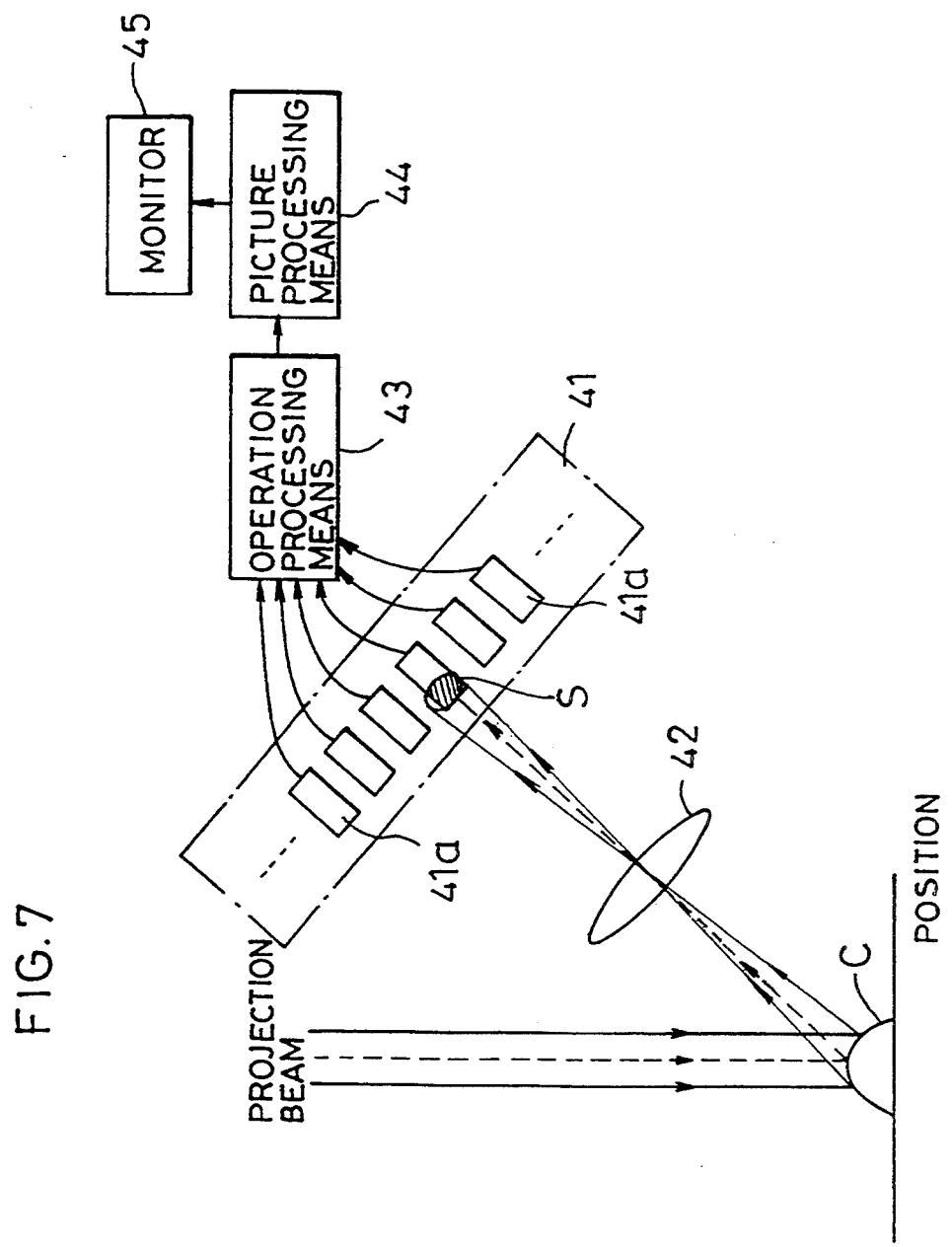
FIGS. 7 through 18 are schematic explanatory views for the shape detection apparatus in further embodiments according to the present invention.

In another embodiment shown in FIG. 7, the position detector 41 employs a plurality of light receiving elements respectively of a width smaller than the width of the image-forming spot S for improving the resolution. Thus, a plurality of the light receiving elements 41a are disposed to correspond to the width for which the image-forming beams shift in accordance with the height positions of the reflected beams, and it is possible to detect the shape of the object C in the same manner as in the foregoing embodiments. With such disposition of the light receiving elements 41a, it is possible to attain a wide detection width (dynamic range) for the position detector 41. In the present instance, other constituents and functions than those described are the same as those in the foregoing embodiment of FIGS. 1 to 3, and the constituents are denoted by the same reference numerals as those used in FIGS. 1 to 3 but with "30" added thereto.

Figure 8:
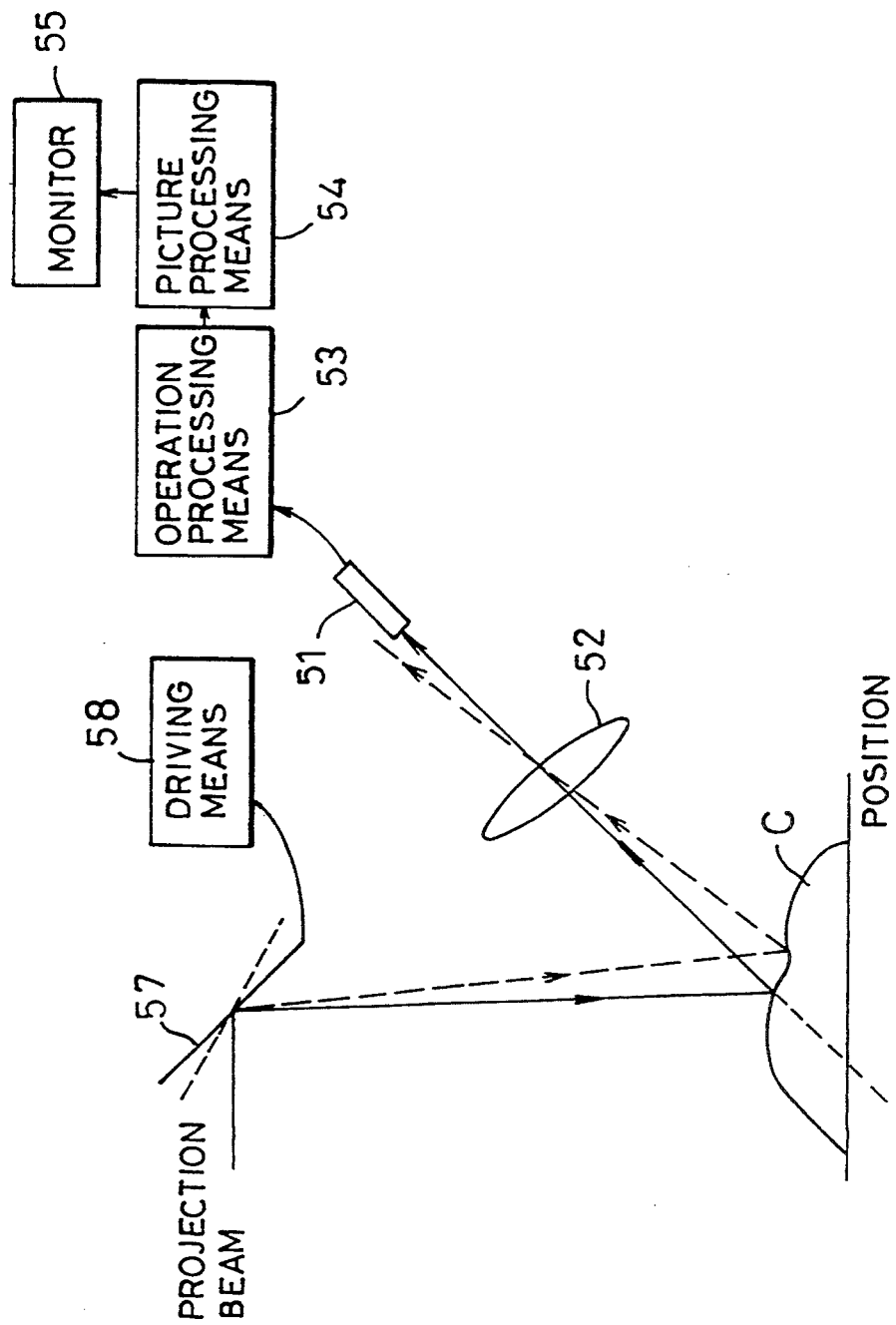

In another embodiment of the present invention as shown in FIG. 8, there is employed the same position detector 51 as that employed in the embodiment shown in FIG. 7, as disposed on the optical axis of the light receiving lens 52, the projected beams are caused by a deflecting means 57 varied in angular position by a driving means 58 to scan the shape of the object C over a desired width, and only the height displacement of the reflected beams along the optical axis of the light receiving lens 52 is to be obtained. Here, the position detector 51 is stationary in its position, with a size having a required resolution range. The scanning of the projected beams is carried out within a plane including both optical axes of the projected beams and of the light receiving lens 52. In this case, two beams respectively of differently modified intensity of light are projected, the height displacement only is to be obtained at points where the ratio of intensity of both beams conincides with a preliminarily set ratio of intensity, and it is enabled to obtain the height displacement at a point smaller than the diameter of each projected beam at the projected spot.

Figure 9:
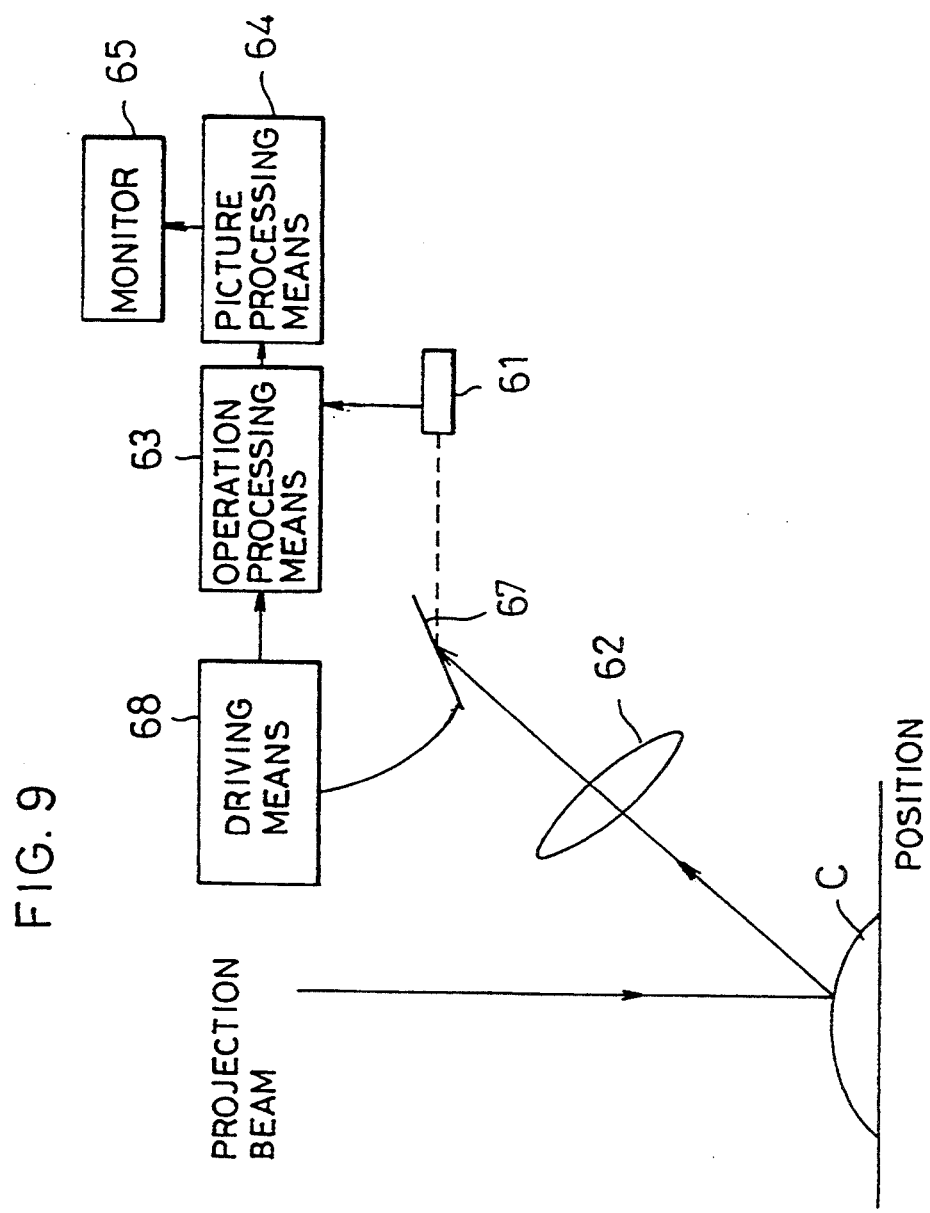
Figure 10:
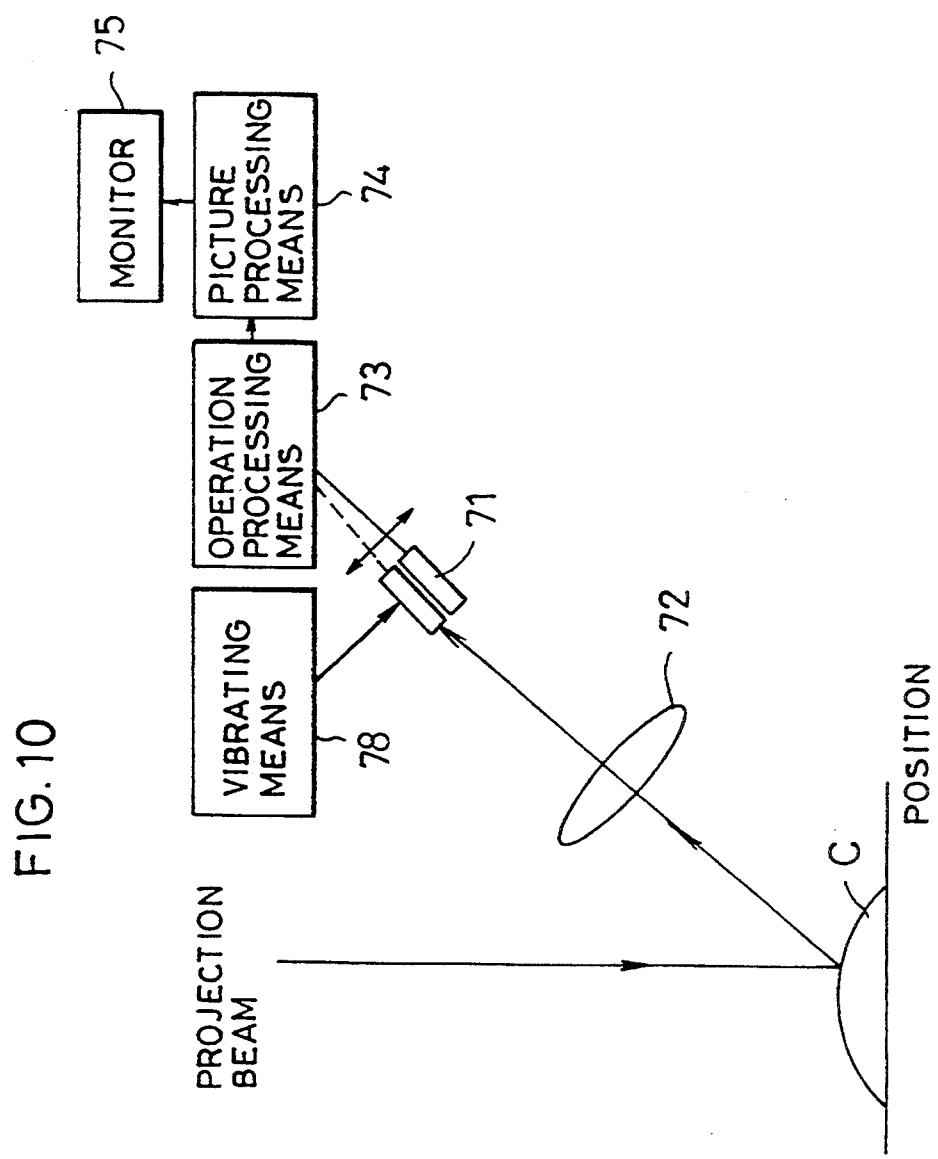
Figure 11:
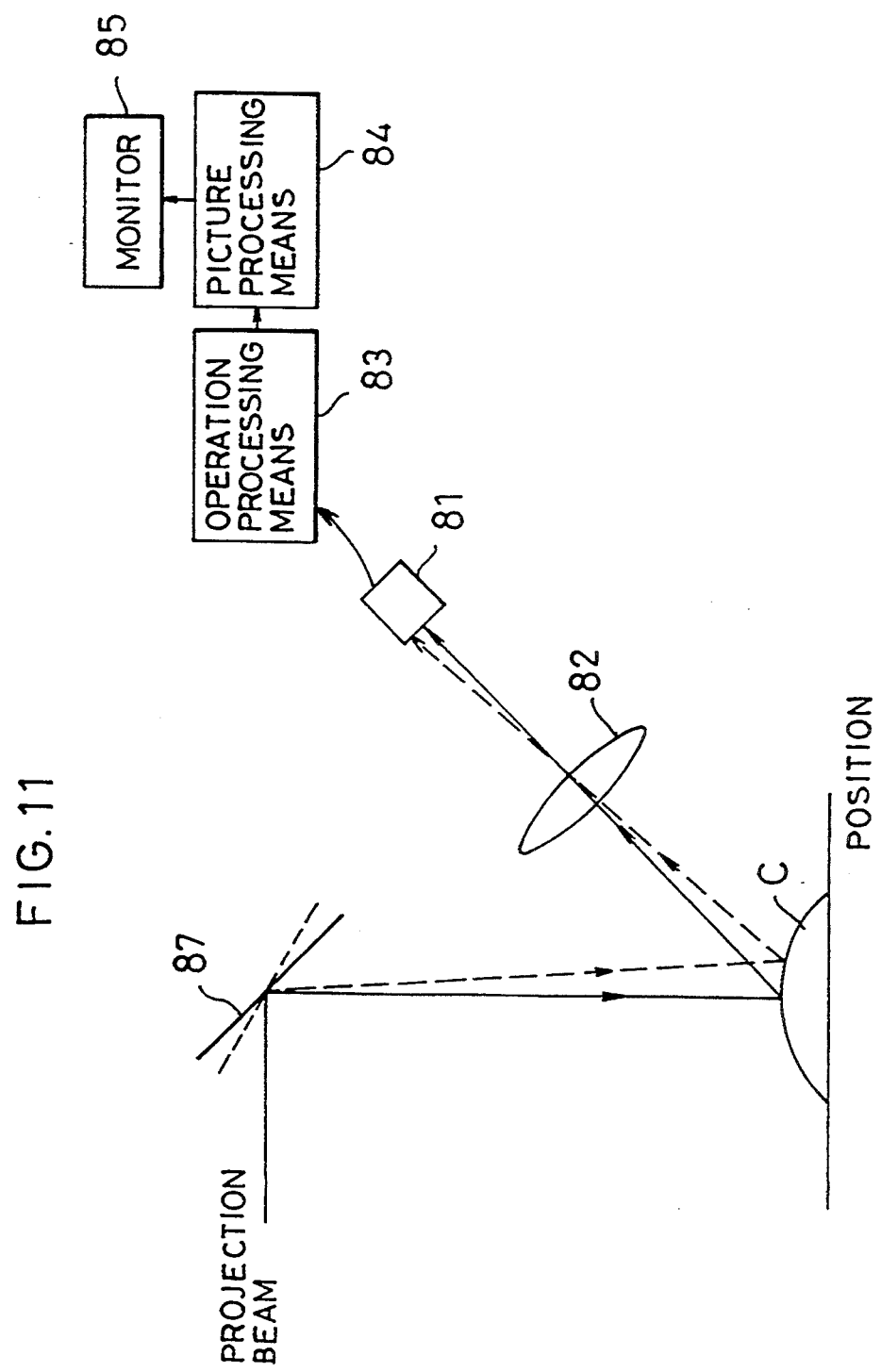
Figure 12:
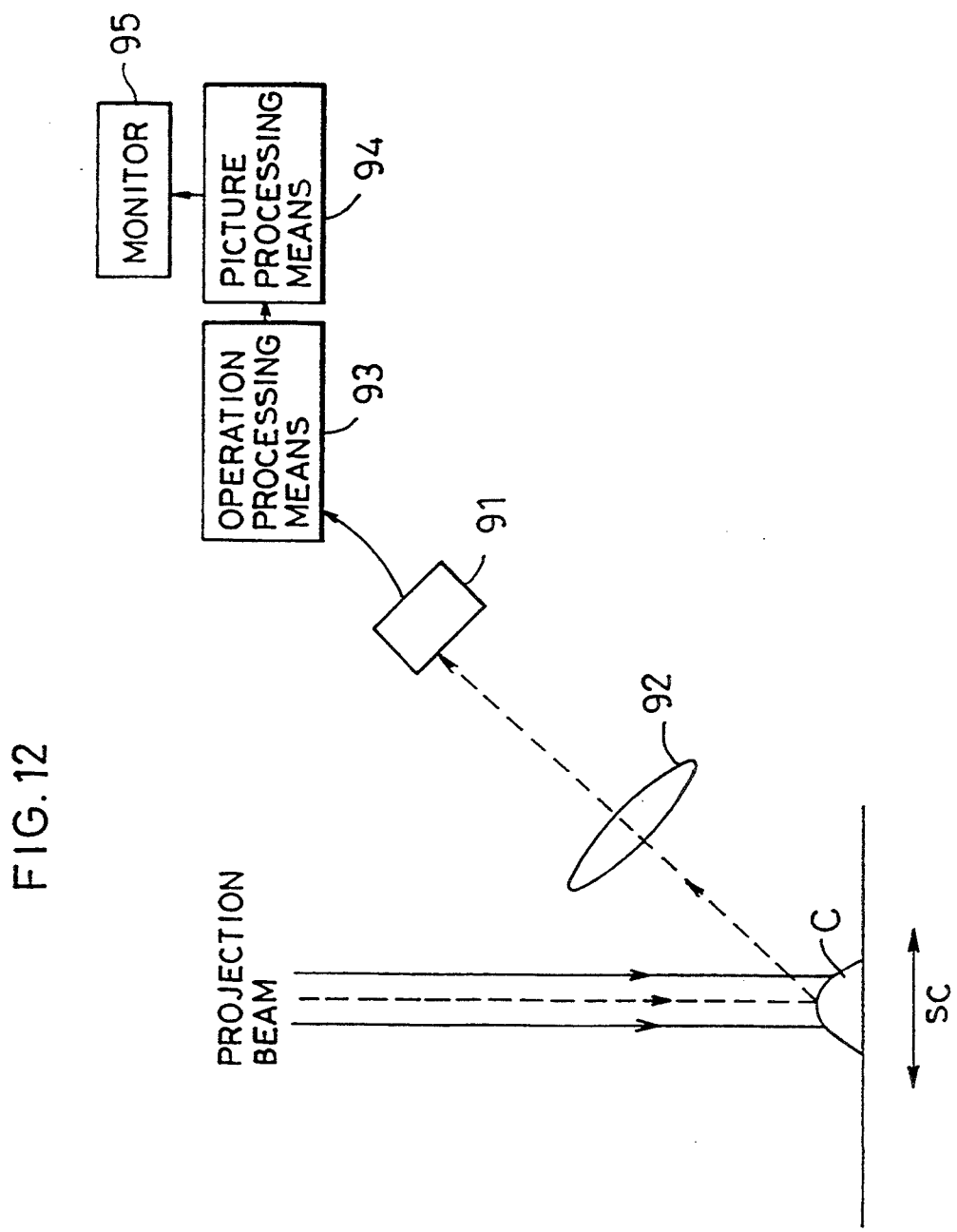

Further, as shown in FIG. 9, the arrangement can be so made that the deflecting means 67 driven by the driving means 68 to vary its angular position is disposed between the light receiving lens 62 and the position detector 61, and the height displacement of the positions within the projected spot where the ratio of intensity of the projected beams coincides with a specific ratio of intensity is detected on the side of the light receiving means. As shown in FIG. 10, further, the arrangement may be so made that the position detector 71 is vibrated by a vibrating means 78, instead of such deflection of beams as in FIGS. 8 and 9, and the height displacement at the positions within the projected spot is obtained on the basis of vibrated positions of the detector 71 at which the ratio of intensity of the projected beams coincide with the specific ratio of intensity. In this event, the relationship of the vibrated positions to the height displacement is made to be preliminarily known. Further, as will be readily appreciated, the position detector 71 is vibrated by the vibrating means 78 within the plane containing both optical axes of the light receiving lens 72 and of the projected beams. As shown further in FIG. 11, the arrangement can be so made as to render the width in which the light receiving elements included in the position detector 81 to be larger than that in the case of FIG. 8, and to obtain the height displacement occurring within a predetermined range in accordance with the width of the light receiving elements upon scanning of the object by the projected beams. Further, even in the case where the object C for the shape detection is moved in the direction shown by arrows SC instead of moving the projected beams as shown in FIG. 12, the same operation as that in the respective aspects shown in FIGS. 8 to 11 can be realized. In these working aspects described with reference to FIGS. 8 to 12, all other constituents and their functions than those described are substantially the same as those in the foregoing embodiment of FIGS. 1 to 3, and are denoted in FIGS. 8 to 12 by the same reference numerals as those used in FIGS. 1 to 3 but with "40", "50", "60", "70" and "80" added respectively thereto.

Figure 13:
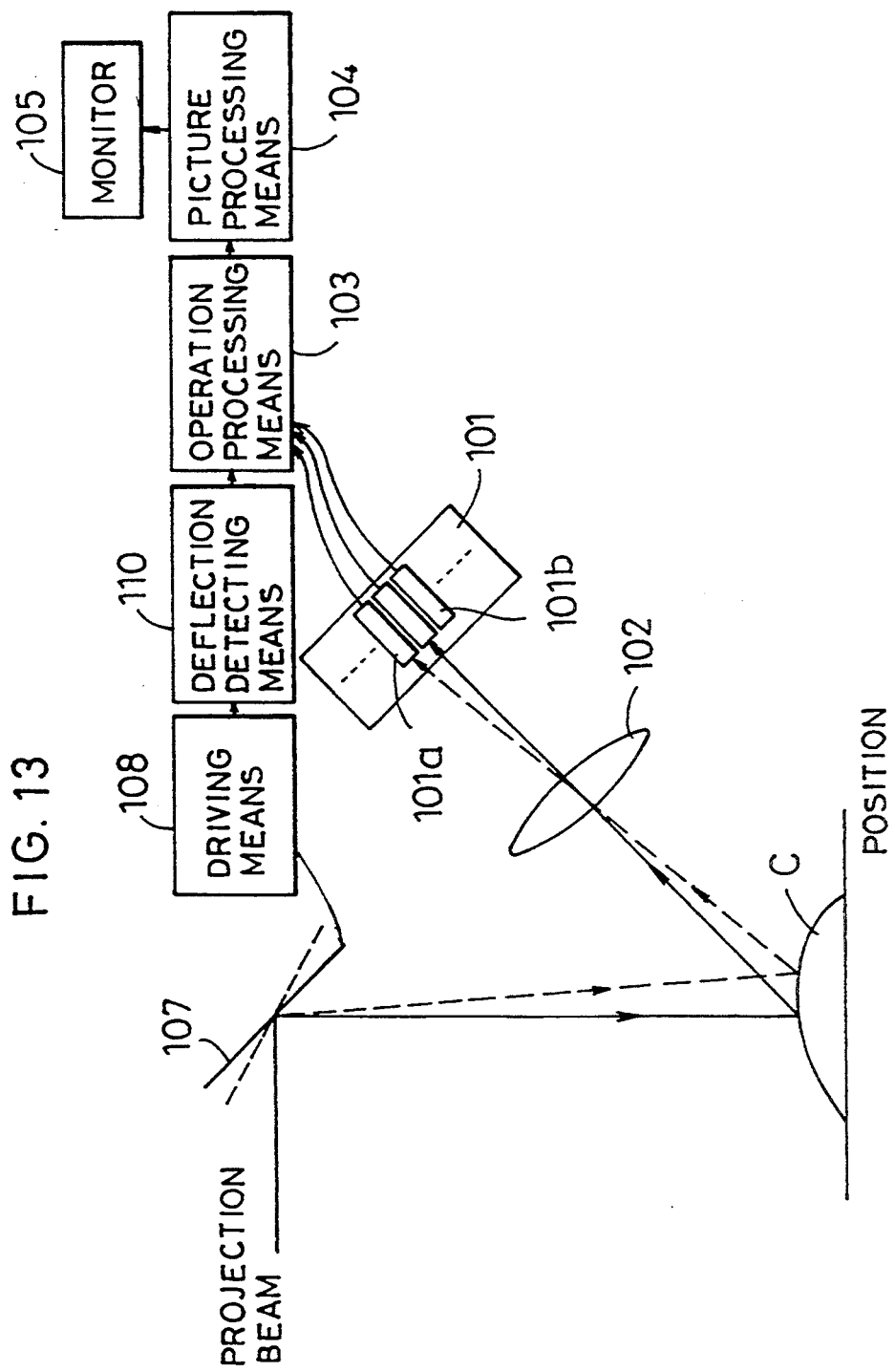

In another embodiment according to the present invention as shown in FIG. 13, the position detector 101 employed here includes a plurality of the light receiving elements 101a, 101b . . . similar to that in the foregoing embodiment of FIG. 7, and the projected beams are deflected by the deflecting means 107 variable in angular position as driven by the driving means 108 to have a predetermined width of the shape of the object C scanned by the deflected beams. In this case, the light receiving elements 101a, 101b, . . . are disposed in correspondence with the scanning width of the projected beams so as to be able to specify at which points on the object C for the shape detection the respective beams projected as deflected are reflected, and the highly precise shape detection over a wide range can be realized. In this embodiment, further, it is preferable to detect an angle of deflection by the deflecting means 107 by, for example, a deflection angle detecting means 110 connected to the driving means 108, and to provide the detected angle to the operation processing means 103.

Figure 14:
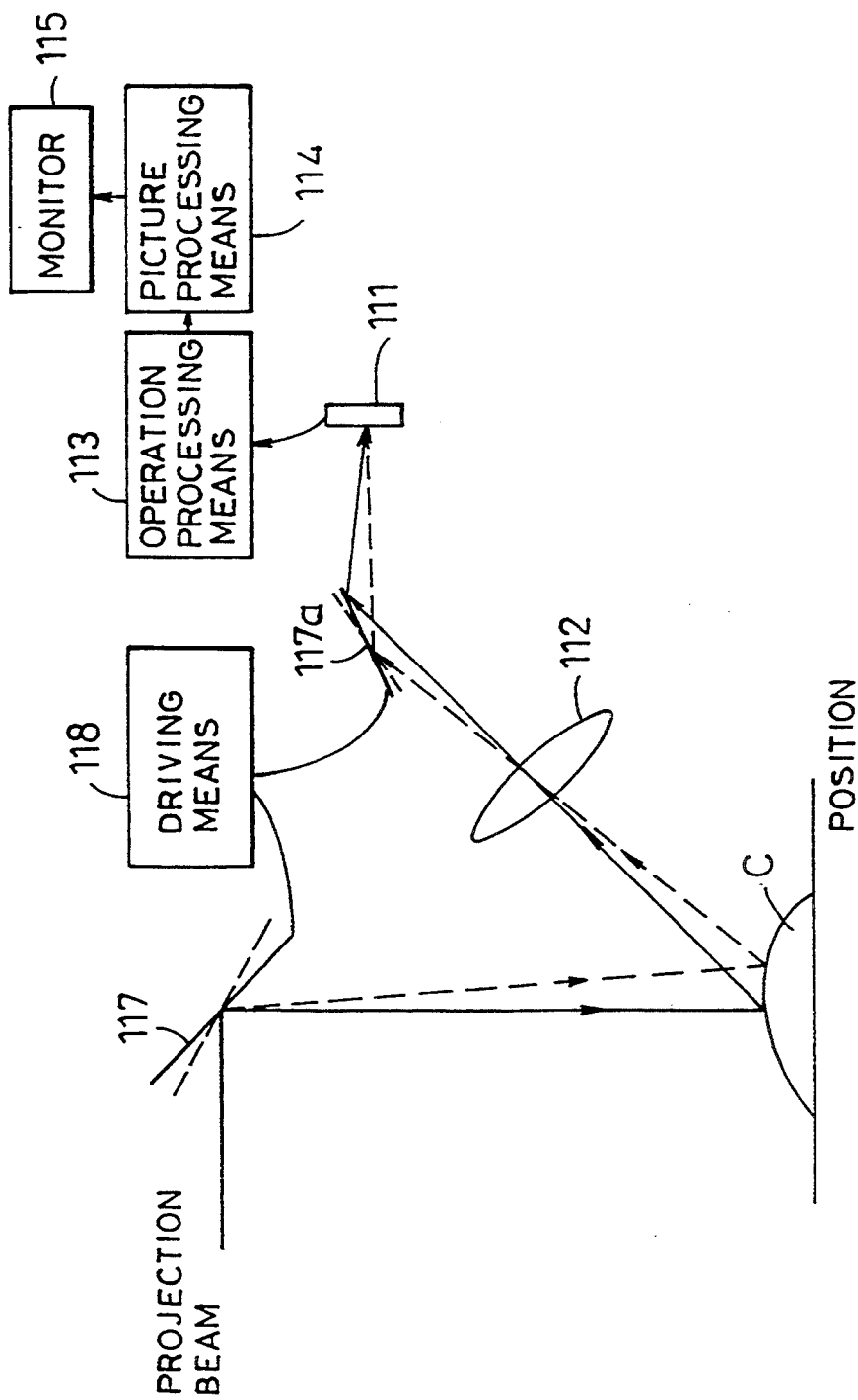
Figure 15:
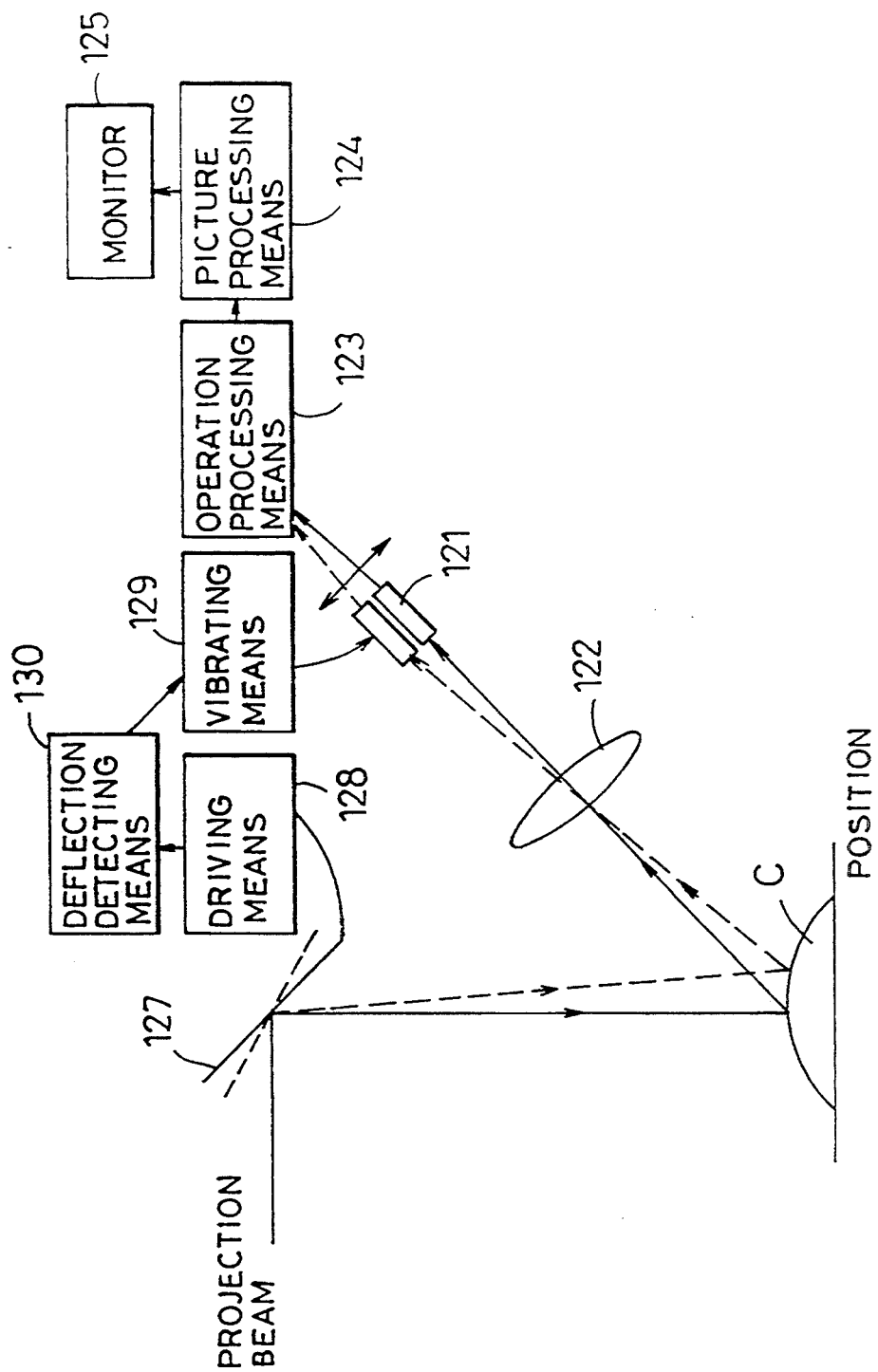

As shown in FIG. 14, on the other hand, such arrangement may also be effectively employed that the scanning for a predetermined width of the object C is carried out by the projected beams deflected by the deflecting means 107 as driven by the driving means 118, and a furhter deflecting means 117a is provided between the light receiving lens 112 and the position detector 111 for subjecting the reflected and received beams to a further deflection corresponding to the above deflection by the deflecting means 117 for the beam scanning. In this case, both deflecting means 117 and 117a are provided for being driven in synchronism with each other, and for memorizing the angle of deflection made by the deflecting means 117 on the side of the projected beams, and the same operation as in the foregoing aspect of FIG. 13 can be carried out. As shown further in FIG. 15, it is also possible to employ an arrangement in which, in place of the deflecting means 117a, the position detector 121 is vibrated by the vibrating means 129, in which the detected deflection angle of the deflecting means 127 by the driving means 128 is provided from the deflection angle detecting means 130 to the vibrating means 129, and the image of the reflected beams can be formed on the same position on the position detector 121. In these working aspects of FIGS. 13 to 15, all other constitients and functions than those described are substantially the same as those in the embodiment of FIGS. 1 to 3, and are denoted by the same reference numerals as those used in FIGS. 1 to 3 but with "90", "100" and "110" added respectively thereto.

Figure 16:
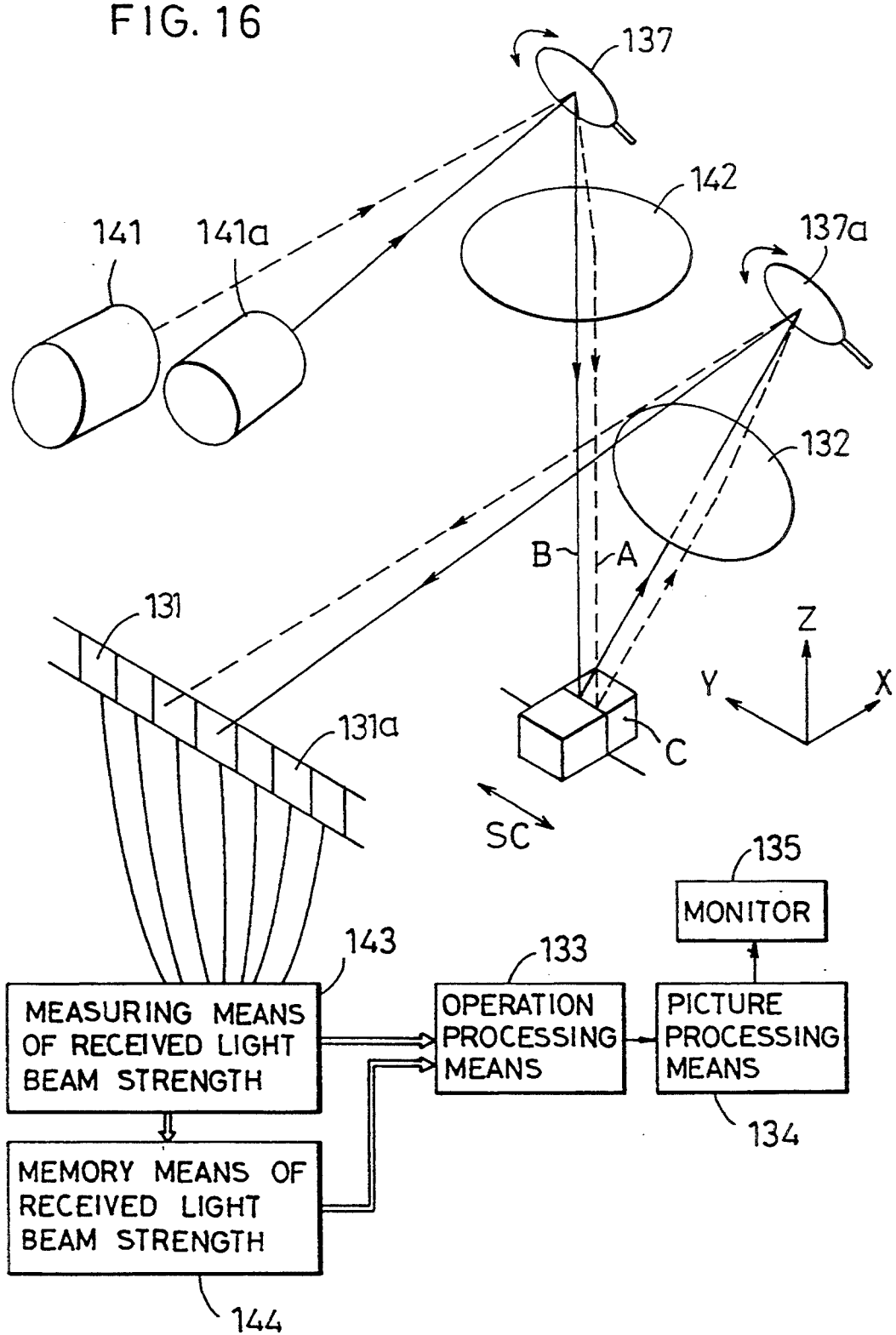

In still another embodiment according to the present invention as shown in FIG. 16, the arrangement is so made that, when the beam from one projector 141 is projected preferably through a projecting lens 142 to the object C for the shape detection, the scanning of the projected beam is made possible only for a predetermined width by the movement in the direction shown by arrows SC of the deflecting means 137 and/or the object C. Further, when the reflected beam from the object C is incident through the light receiving lens 132 upon the light receiving element 131a of the position detector 131, the reflected beam is further subjected to a deflection by means of another deflecting means 137a in correspondence with the deflection for the scanning by the projected beam, and the image of the reflected beam is formed on the light receiving element 131. In the present instance, in particular, one or more of another projector 141a is provided for projection of the further projected beam of a different pattern from that of the above projector 141. In this case, the arrangement is so made that the projected beam from another projector 141a is detected by the light receiving elements as delayed at least by one of the elements in the position detector 131 in the scanning direction with respect to the projected beam from the projector 141. Thus the beam A from the projector 141 is projected onto the object C prior to the beam B from the other projector 141a, the intensity of received light is measured at a means 143 for measuring the intensity of received light upon reception of the reflected beam at one surface point of the object C, this measured value is stored at a memory means 144 for the intensity of received light, the ratio of intensity of the received light is operated at the operation processing means 133 when next reflected beam has reached the same point, and the highly precise detection of the height displacement can be executed.

Further, even in an event where the surface of the object C being detected is lower than the reference plane in the embodiment of FIG. 16, the image of the reflected beam therefrom of the one beam is formed on the position detector 131 always prior to that of the other beam by at least one of the light receiving elements in the scanning direction, and there occurs no interference between the two beams. Accordingly, as will be readily appreciated, the highly precise positional detection can be realized even when the projected beams are made to be of identical characteristics.

Figure 17:
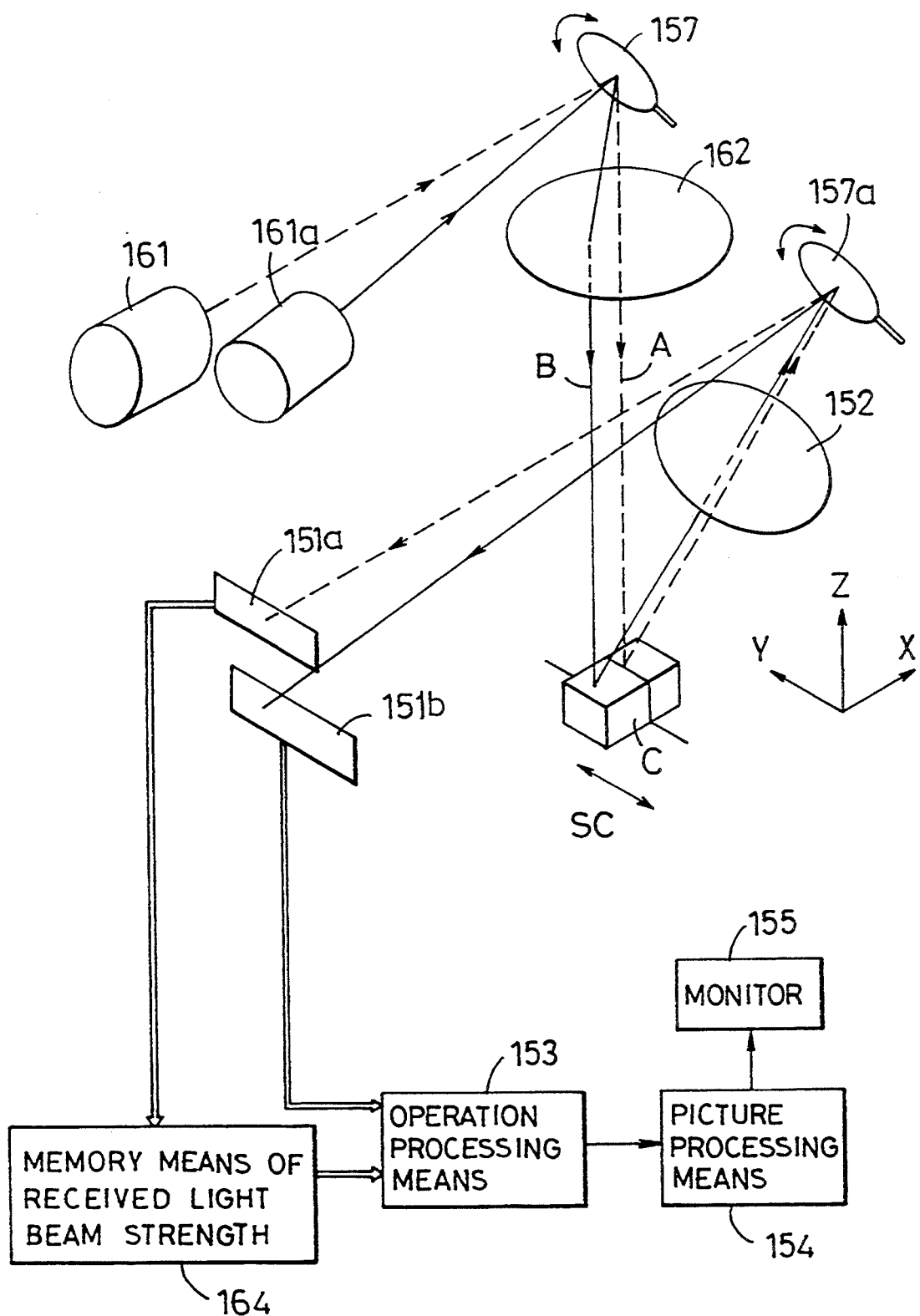

As shown in FIG. 17, the arrangement can be so made that the plurality of projected beams are made to scan the shape of the object C respectively along each of different scanning lines and to be received by a plurality of the position detectors 151a and 151b, and, when a succeeding projected beam has reached the same scanning point relative to the scanning line of the preceding projected beam, the operation processing means 153 operates the ratio of intensity of the received beams on the basis of outputs from the memory means 164 for the intensity of received beam of the preceding projected beam and from the other position detector 151b.

Figure 18:
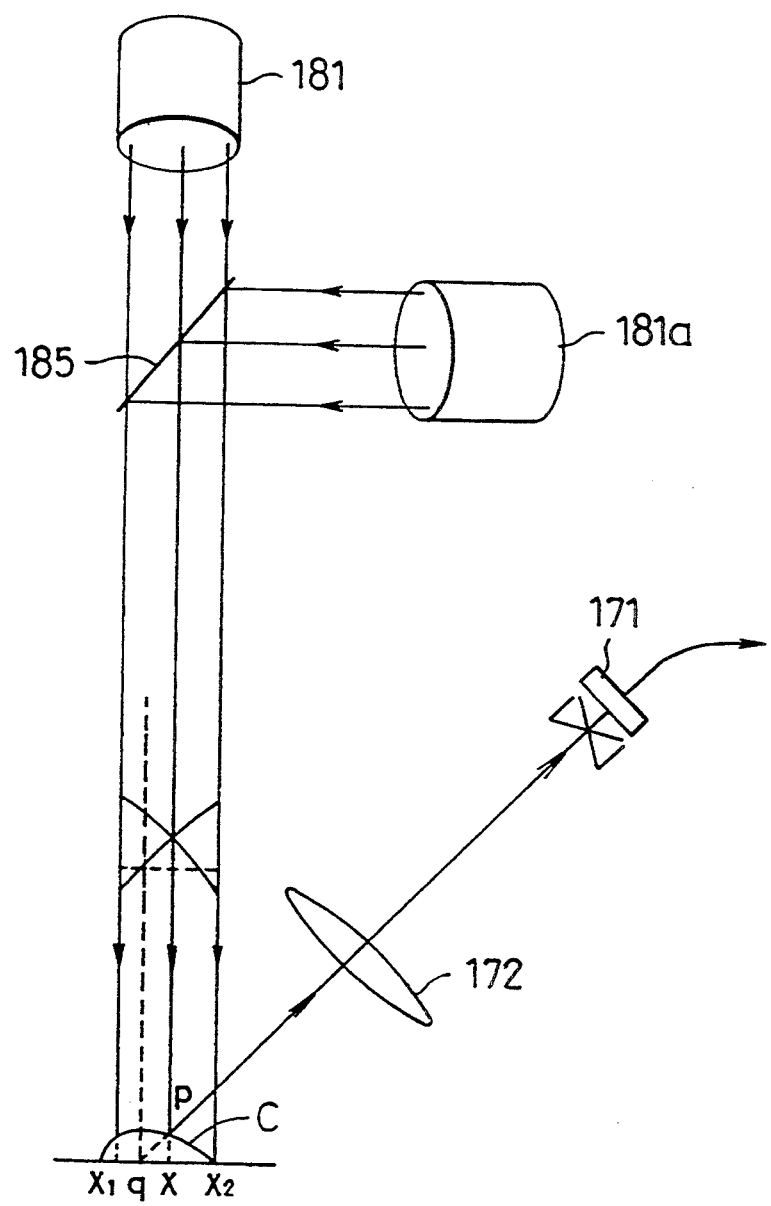
Figure 19:
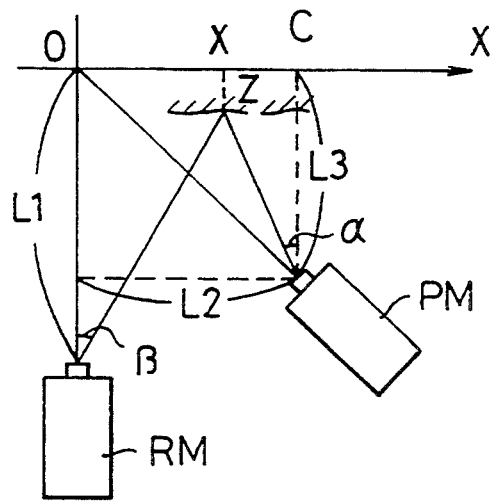
FIGS. 19, 20A–20C and 21 are explanatory views of known arrangements.
Figure 21:
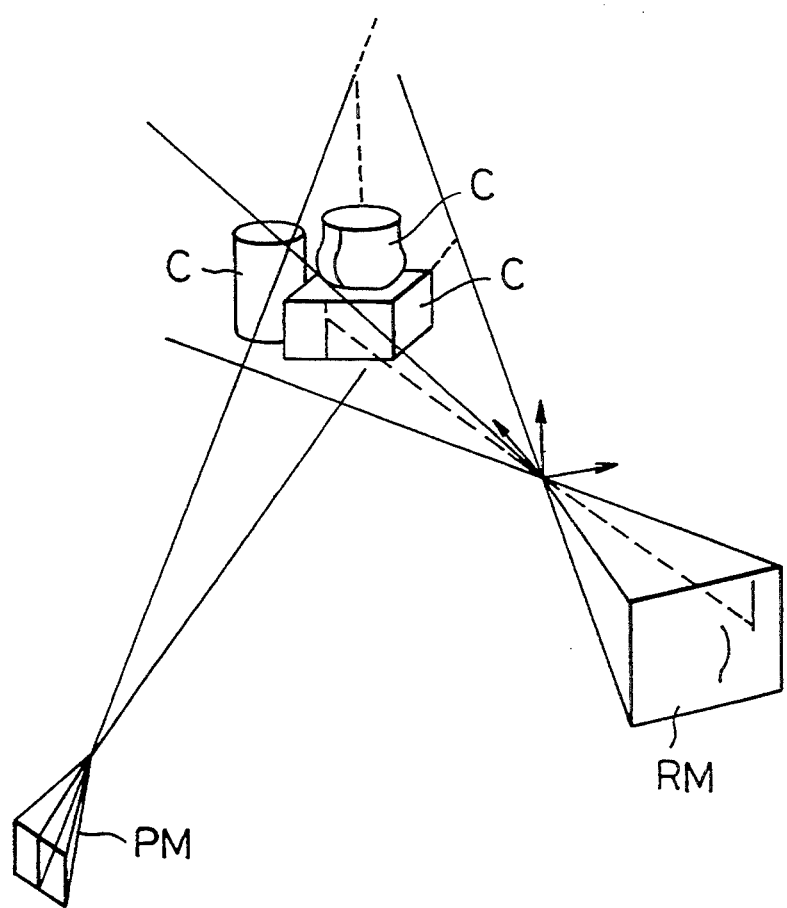
Figure 20A:
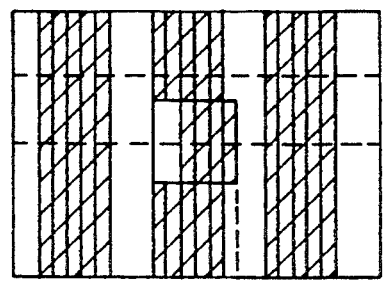
Figure 20B:
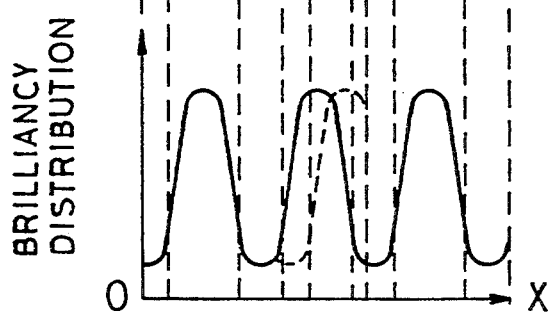
Figure 20C:
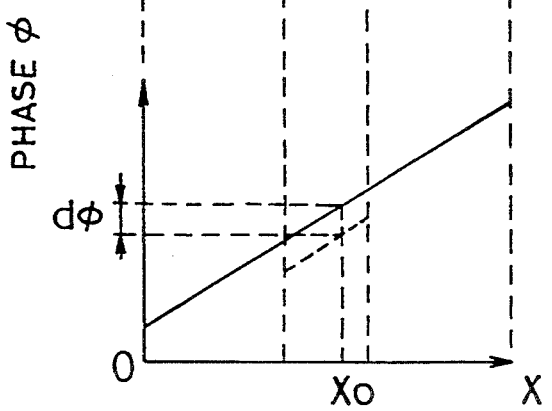

In addition, for the light projector to be used in the foregoing embodiments, it is also possible to effectively employ two projectors 181 and 181a, for example, which are disposed to be mutually at right angles as shown in FIG. 18 for projecting the beams through a half-mirror 185 onto the object C for the shape detection, and their reflected beams are received through the light receiving lens 172 by the position detector 171.

What is claimed is:

1. A method for stereoshape detection of an object by projecting light beam thereon to form a beam spot on the object, and receiving reflected beams from the projected beam spot from the object in a direction different from that of the projection, wherein a plurality of said beams which are respectively modified to be of mutually different patterns are projected onto an identical spot on said object substantially in an identical direction, an image provided by each of reflected beams from said projected beam spot on the object is formed on a position detecting means, a ratio of intensity of light of said reflected beams at a point in the projected beam spot is obtained on the basis of outputs from said position detecting means, a position of the point in the projected beam spot on the object is detected on the basis of variation components in said ratio of intensity of light with respect to a reference plane for detecting the position of the point on the object, and a height displacement of the point in the projected beam spot with respect to said reference plane is obtained on the basis of the detected position and of an incident angle of the reflected beams in said position detecting means with respect to the reference plane.

2. The method according to claim 1, wherein said mutually different patterns of said projected beams are of intensity of light, and said images of respective said reflected beams are formed on art identical one of said position detecting means.

3. The method according to claim 1, wherein said mutually different patterns of said projected beams are of wavelengths of light, and said image of each of said reflected beams is formed on one of a plurality of light receiving elements included in said position detecting means, each said light receiving element being detectable only one reflected beam in one of said different wavelengths.

4. The method according to claim 1, wherein said different patterns of the projected beams are of the intensity of light and further of a wavelength of light, the projected beams are projected concurrently, and said image of each of said reflected beams from the projected beam spot is formed on one of a plurality of light receiving elements included in said position detecting means, each said light receiving element being detectable only one reflected beam in one of said different wavelengths.

5. The method according to claim 1, wherein said projected beams mutually different in said pattern with respect to the intensity of light are respectively projected with a time difference, and said image of each of said reflected beams is formed on one of a plurality of light receiving elements included in said position detecting means, each said light receiving element detecting only one of reflected beam respectively subjected to one of different deflections.

6. The method according to claim 1, wherein said projected beams mutually different in said pattern with respect to the intensity of light are projected respectively concurrently as subjected to different deflection modes, and said image of each of said reflected beams is formed on one of a plurality of light receiving elements included in said position detecting means, each said light receiving element detecting only one of the reflected beams in said deflection modes.

7. The method according to claim 1, wherein said projected beams are respectively provided in their intensity of light with a Gauss distribution, and are projected as mutually separated by a predetermined distance.

8. The method according to claim 1, wherein said position detecting means is arranged to include a light receiving element divided into parts respectively made smaller in the width than that of a spot of image formed by each of said reflected beams, and said image of each of said reflected beams is formed on each of said divided parts of said light receiving element.

9. The method according to claim 1, wherein said projected beams are caused to move their optical axis to scan for a predetermined width on the object within a plane including respective optical axes of said projected beams, reflected beams and position detecting means, and said shape detection is carried out at a scanning position where said ratio of intensity of light coincides with a preliminarily set ratio of intensity.

10. The method according to claim 1, wherein said reflected beams are caused to move their optical axis to scan for a predetermined width on the position detecting means within a plane including respective optical axes of said projected beams, reflected beams and position detecting means, and said shape detection is carried out at a scanning position where said ratio of intensity coincides with a preliminarily set ratio of intensity.

11. The method according to claim 1, wherein said projected beams are moved to scan a surface of said object for the shape detection.

12. The method according to claim 1, wherein said object for the shape detection is moved for being scanned by said projected beams.

13. The method according to claim 1, wherein said projected beams are made to scan a surface of said object for the shape detection, and said position detecting means is disposed at a position where an image of the scanned surface corresponding to a width of the surface scanned is formed.

14. The method according to claim 1, wherein said projected beams are made to scan a surface of the object, and said reflected beams from the object are deflected towards said position detecting means.

15. The method according to claim 1, wherein said projected beams are respectively made to scan a predetermined width of a surface of the object within a plane including optical axes of the projected beams, reflected beams and position detecting means, and said images of the respective reflected beams are formed on an identical light receiving element included in the position detecting means.

16. The method according to claim 1, wherein said projected beams are made to scan a predetermined width of a surface of the object in a direction perpendicular to a plane including optical axes of the projected beams, reflected beams and position detecting means, and said images of the reflected beams are formed on the position detecting means disposed along a displacing direction of the reflected beams due to the scanning of the projected beams.

17. A method for stereoshape detection of an object by projecting light beam thereon to form a beam spot on the object, and receiving reflected beams from the projected beam spot from the object in a direction different from that of the projection, wherein a plurality of said beams which are respectively modified to be of mutually different patterns are projected onto an identical spot on said object substantially in an identical direction, an image provided by each of reflected beams from said projected beam spot on the object is formed on a position detecting means, a ratio of intensity of light of said reflected beams at a point in the projected beam spot is obtained on the basis of outputs from said position detecting means, a position of the point in the projected beam spot on the object is detected on the basis of variation components in said ratio of intensity of light with respect to a reference plane for detecting the position of the point on the object, and a height displacement of the point in the projected beam spot with respect to said reference plane is obtained on the basis of the detected position and of an incident angle of the reflected beams in said position detecting means with respect to the reference plane, wherein said position detecting means is vibrated for a predetermined width within a plane including respective optical axes of said projected beams, reflected beams and position detecting means, and said shape detection is carried out at a scanning position in said vibrated width of the position detecting means where said ratio of intensity coincides with a predetermined ratio of intensity.

18. A method for stereoshape detection of an object by projecting light beam thereon to form a beam spot on the object, and receiving reflected beams from the projected beam spot from the object in a direction different from that of the projection, wherein a plurality of said beams which are respectively modified to be of mutually different patterns are projected onto an identical spot on said object substantially in an identical direction, an image provided by each of reflected beams from said projected beam spot on the object is formed on a position detecting means, a ratio of intensity of light of said reflected beams at a point in the projected beam spot is obtained on the basis of outputs from said position detecting means, a position of the point in the projected beam spot on the object is detected on the basis of variation components in said ratio of intensity of light with respect to a reference plane for detecting the position of the point on the object, and a height displacement of the point in the projected beam spot with respect to said reference plane is obtained on the basis of the detected position and of an incident angle of the reflected beams in said position detecting means with respect to the reference plane, wherein said projected beams are made to scan a width of a surface of the object, and said position detecting means is vibrated to be at a position where an image of the scanned surface corresponding to that of said scanning width is formed.

19. An apparatus for stereoshape detection of an object, comprising means for projecting a plurality of light beams respectively modified to be in mutually different patterns onto an identical spot on said object and substantially in an identical direction, a position detecting means on which an image provided by reflected beams from the projected beam spot on the object is formed, and an operation processing means for obtaining from outputs of said position detecting means a ratio of intensity of light of the reflected beams at a point in said projected beam spot, detecting a position of the point in the beam spot on a reference plane from variation components in said ratio of intensity of light with respect to the reference plane, and obtaining a height displacement of the point in the projected beam spot with respect to the reference plane on the basis of the detected position and of an incident angle of the reflected beams into the position detecting means with respect to the reference plane.

* * * * *